US010839354B1

(12) United States Patent
Hughes et al.

(10) Patent No.: US 10,839,354 B1
(45) Date of Patent: Nov. 17, 2020

(54) HOME SCREEN AGENT AND INSURANCE CARD WIDGET

(71) Applicant: State Farm Mutual Automobile Insurance Company, Bloomington, IL (US)

(72) Inventors: David J. Hughes, Bloomington, IL (US); Scott Anderson, Goodfield, IL (US); David Arnold, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 574 days.

(21) Appl. No.: 15/138,812

(22) Filed: Apr. 26, 2016

Related U.S. Application Data

(60) Provisional application No. 62/156,668, filed on May 4, 2015, provisional application No. 62/160,309, filed
(Continued)

(51) Int. Cl.
*G06Q 10/10* (2012.01)
*G06F 3/0484* (2013.01)
(Continued)

(52) U.S. Cl.
CPC ....... *G06Q 10/109* (2013.01); *G06F 3/04842* (2013.01); *G06Q 40/02* (2013.01); *G06Q 40/08* (2013.01)

(58) Field of Classification Search
None
See application file for complete search history.

(56) References Cited

U.S. PATENT DOCUMENTS 9,390,452 B1  7/2016 Biemer et al.
9,996,878 B1 * 6/2018 Fox .......................... H04W 4/40
(Continued)

FOREIGN PATENT DOCUMENTS

WO  WO-2012090146 A2 * 12/2011 ............. G06Q 40/08

OTHER PUBLICATIONS

Image of "Expired Indicia on Diplomatic Driving License" dated Mar. 12, 2002.*
(Continued)

*Primary Examiner* — Alexander G Kalinowski
*Assistant Examiner* — Blane A Lickteig
(74) *Attorney, Agent, or Firm* — Faegre Drinker Biddle & Reath

(57) ABSTRACT

A computer program for providing access to auto insurance information comprises a first software widget and a second software widget. The first software widget may appear on a display of a mobile electronic device. When selected by a user, the first software widget displays a first information screen that includes a phone number and a mailing address for an insurance agent of the user. The second software widget may also appear on the display. When selected by the user, the second software widget displays a second information screen that includes an image of an auto insurance card of the user. The second software widget may compare an expiration date from the second information screen with the current date and generate a first indicia if the expiration date occurred before the current date (such as if the virtual auto insurance card is out of date and needs to be updated).

9 Claims, 7 Drawing Sheets

Related U.S. Application Data on May 12, 2015, provisional application No. 62/181,589, filed on Jun. 18, 2015, provisional application No. 62/187,029, filed on Jun. 30, 2015.

(51) Int. Cl.
  *G06Q 40/08* (2012.01)
  *G06Q 40/02* (2012.01)

(56) References Cited

U.S. PATENT DOCUMENTS

| | | | |
|---|---|---|---|
| 10,282,785 B1 | 5/2019 | Yager et al. | |
| 2001/0044733 A1 | 11/2001 | Lee et al. | |
| 2003/0119585 A1 | 6/2003 | Walker et al. | |
| 2006/0106725 A1* | 5/2006 | Finley, Jr. | G06F 3/04817 705/59 |
| 2006/0143114 A1 | 6/2006 | Schuver et al. | |
| 2006/0274945 A1* | 12/2006 | Chu | G06Q 10/10 382/190 |
| 2008/0208636 A1 | 8/2008 | Case | |
| 2009/0018889 A1* | 1/2009 | Petersen | G06Q 10/10 705/7.37 |
| 2010/0011304 A1* | 1/2010 | van Os | G06F 3/04817 715/762 |
| 2010/0312691 A1* | 12/2010 | Johnson, Jr. | G06Q 40/02 705/38 |
| 2011/0035238 A1 | 2/2011 | Salvagio | |
| 2012/0096384 A1 | 4/2012 | Albert et al. | |
| 2012/0239417 A1 | 9/2012 | Pourfallah et al. | |
| 2013/0297352 A1 | 11/2013 | Noe et al. | |
| 2014/0032482 A1 | 1/2014 | Dulaney et al. | |
| 2014/0278582 A1 | 9/2014 | Shambach et al. | |
| 2014/0298247 A1 | 10/2014 | Cho | |
| 2015/0143248 A1 | 5/2015 | Beechuk et al. | |
| 2016/0026364 A1 | 1/2016 | Dziuba et al. | |
| 2016/0248865 A1 | 8/2016 | Dotan-Cohen et al. | |

OTHER PUBLICATIONS

Expired Indicia on Diplomatic Driving License dated Mar. 12, 2002.*

* cited by examiner

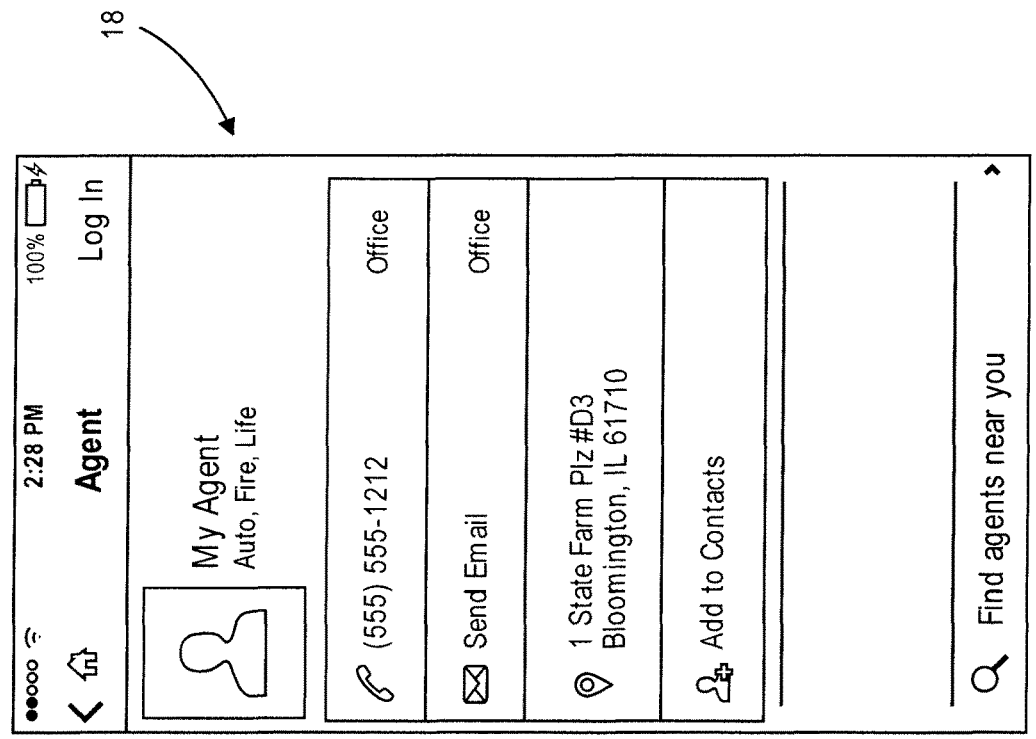
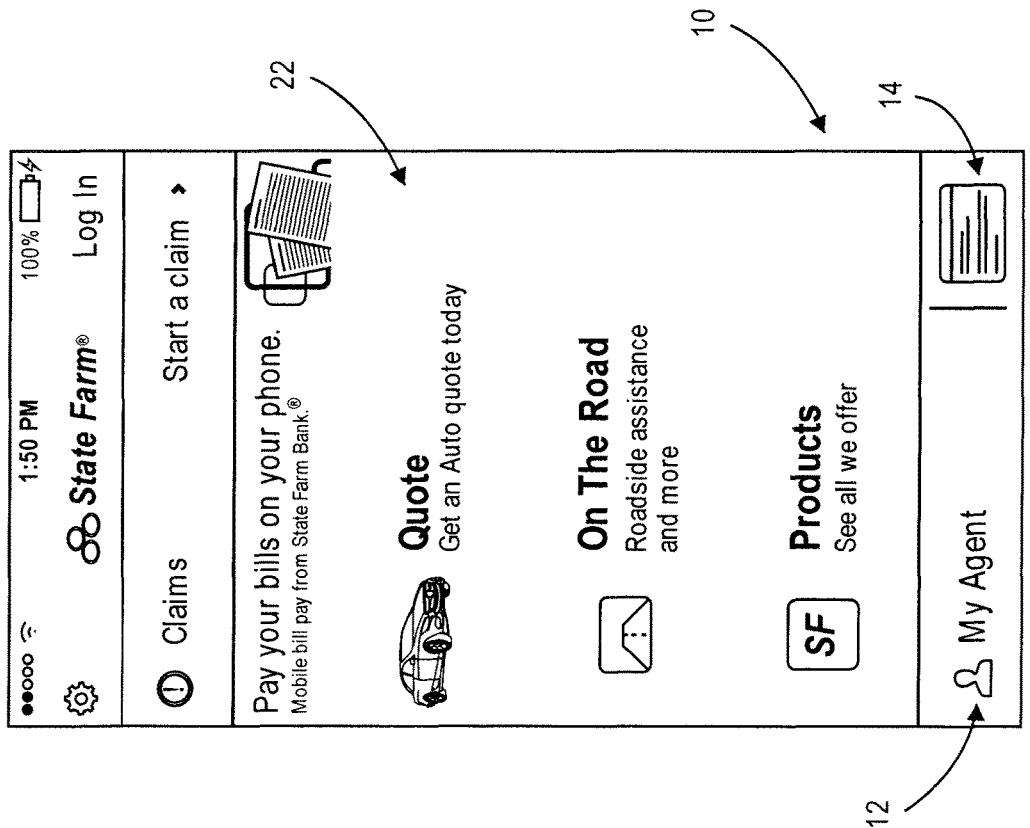
FIG. 4
FIG. 3

HOME SCREEN AGENT AND INSURANCE CARD WIDGET

RELATED APPLICATIONS

The present patent application is a non-provisional patent application which claims priority benefit to U.S. Provisional Patent Application Ser. No. 62/156,668, titled "HOME SCREEN AGENT AND INSURANCE CARD WIDGET", filed May 4, 2015; U.S. Provisional Patent Application Ser. No. 62/160,309, titled "HOME SCREEN AGENT AND INSURANCE CARD WIDGET", filed May 12, 2015; U.S. Provisional Patent Application Ser. No. 62/181,589, titled "HOME SCREEN AGENT AND INSURANCE CARD WIDGET", filed Jun. 18, 2015; and U.S. Provisional Patent Application Ser. No. 62/187,029, titled "HOME SCREEN AGENT AND INSURANCE CARD WIDGET", filed Jun. 30, 2015. The listed earlier-filed provisional patent applications are hereby incorporated by reference in their entireties into the current document.

FIELD OF THE INVENTION

The present disclosure generally relates to a method, computer program, and system for display information and images on a mobile electronic device in association with an automobile insurance policy.

BACKGROUND

Software applications that run on mobile electronic devices often allow a user to access confidential information, such as auto insurance policy information. Typically, the user is required to authenticate his identification, such as by typing in a username and password (also known as "logging in"), on an insurance company website before gaining access to the confidential information associated with his account. The user may be required to log in to access his insurance agent's name or auto insurance card information. However, in certain situations, such as after an auto accident, the user typically needs to know his insurance card information and agent's contact data. At that time, it may be inconvenient to have to log in to a website in order to gain access to information that is valuable but does not compromise the user's security or privacy.

BRIEF SUMMARY

Embodiments of the present technology relate to computer programs and computer-implemented methods for providing access to auto insurance information. The embodiments provide software widgets that run on, or are executed on, a mobile electronic device. When the software widgets are selected, they display contact information for an insurance agent of a user. The software widgets may also display an image of an auto insurance card of the user, as well as generate an indicia when information on the auto insurance card, or the auto insurance card itself or associated auto insurance policy, is out of date.

In a first aspect, a computer program for providing access to auto insurance information may be provided. The computer program may comprise a first software widget and a second software widget. The first software widget may appear on a display of a mobile electronic device operated by a user, such as an insurance policy holder. When selected by the user, the first software widget displays a first information screen that may include a phone number and/or a mailing address for an insurance agent of the user. The second software widget may also appear on the display of the mobile electronic device. When selected by the user, the second software widget may display a second information screen, which may include an image of an auto insurance card of the user. The computer program may include additional, less, or alternate functionality, including that discussed elsewhere herein.

In another aspect, a computer-implemented method for providing access to auto insurance information may be provided. The method may include: (1) displaying a first software widget and/or a second software widget on a display of a mobile electronic device; (2) receiving input from a user; (3) displaying a first information screen when the user selects the first software widget; (4) displaying a second information screen when the user selects the second software widget; (5) comparing expiration date information from the second information screen with the current date; and/or (6) displaying a first indicia if the expiration date occurred before the current date. The method may include additional, fewer, or alternative actions, including those discussed elsewhere herein.

In another aspect, a computer-readable medium for providing access to auto insurance information may be provided. The computer-readable medium may include an executable program stored thereon, wherein the program instructs a processing element of a mobile electronic device to perform the following steps: (1) displaying a first software widget and a second software widget on a display of a mobile electronic device; (2) receiving input from a user; (3) displaying a first information screen when the user selects the first software widget; (4) displaying a second information screen when the user selects the second software widget; (5) comparing expiration date information from the second information screen with the current date; and/or (6) displaying a first indicia if the expiration date occurred before the current date. The program stored on the computer-readable medium may instruct the processing element to perform additional, fewer, or alternative actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of computer programs and computer-implemented methods disclosed therein. It should be understood that each Figure depicts an embodiment of a particular aspect of the disclosed computer programs and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

FIG. 3 illustrates an exemplary screen capture from the mobile electronic device depicting the first and second software widgets being executed on a screen with a software application;

FIG. 4 illustrates an exemplary screen capture from the mobile electronic device depicting a first information screen that is displayed when the first software widget is selected;

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments described in this patent application and other possible embodiments may relate to, inter alia, computer programs and computer-implemented methods for providing access to auto insurance information. Exemplary computer programs may include a plurality of software widgets. Software widgets are graphical user interface (GUI) objects that when selected or activated may perform a simple, usually one-time, function. Software widgets may run on, or be executed on, a mobile electronic device, such as a smart watch, a smart phone, a tablet, a laptop computer, smart glasses, other mobile or computing device, or the like.

Embodiments of the present invention may provide a first software widget and a second software widget. The first software widget, when selected, may display the name, phone number, location, email address, and the like of the user's insurance agent. The second software widget, when selected, may display an image of the user's auto insurance card. Alternatively, the second software widget, when selected, may display a list of the limits and features of the user's auto insurance policy, or at least the same information as shown on the insurance card.

When implemented on an iOS mobile electronic device, the first and second software widgets may appear on a screen under the "Today" tab in the "Notifications Center". When implemented on an Android™ mobile electronic device, the first and second software widgets may appear on a home screen. Additionally, or alternatively, the first and second software widgets may appear on a first screen of a software application that is provided by an auto insurance company. The information displayed by the first and second software widgets would previously only have been available to the user after authenticating his identification, or logging in, using the software application.

The second software widget may also generate an alert to indicate to the user that the information shown on the auto insurance card, or the card itself, is out of date. The alert may appear on top of, or overlayed on, the second software widget. When the alert appears, selection of the second software widget may display the image of the user's auto insurance card with a verbal indication that the card itself, and not necessarily the insurance policy, has expired.

Exemplary Computer Program

Figure 2:
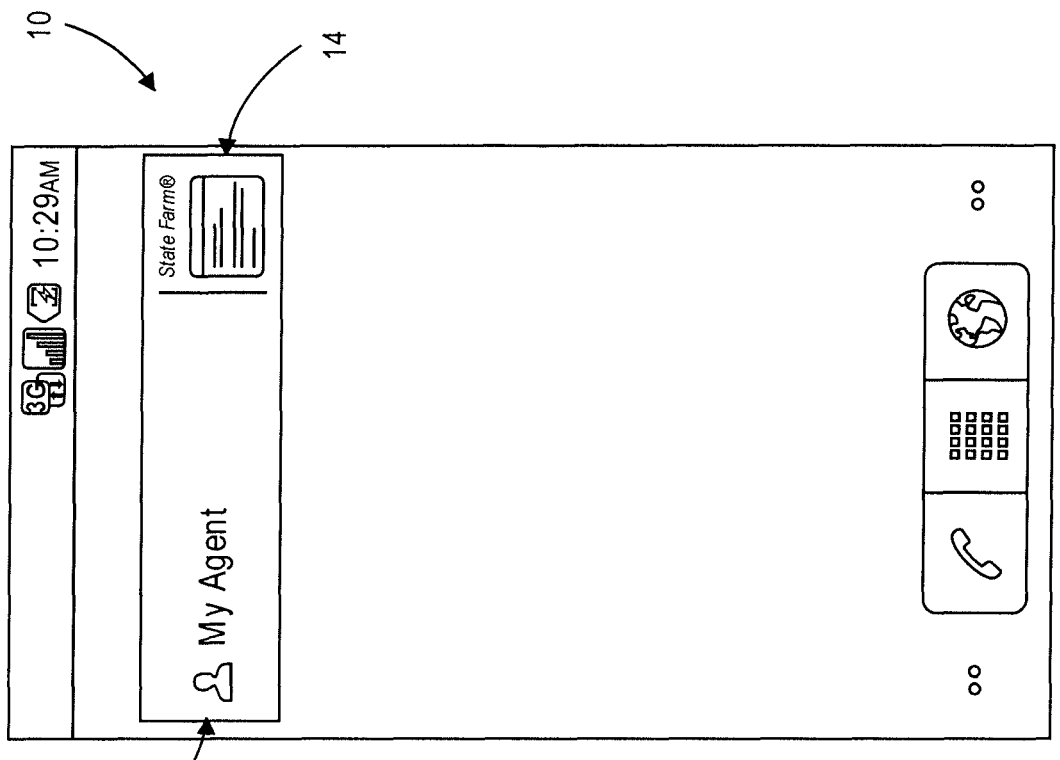
FIG. 2 illustrates an exemplary screen capture of a mobile electronic device with a second operating system platform depicting the computer program with the first and second software widgets.
Figure 1:
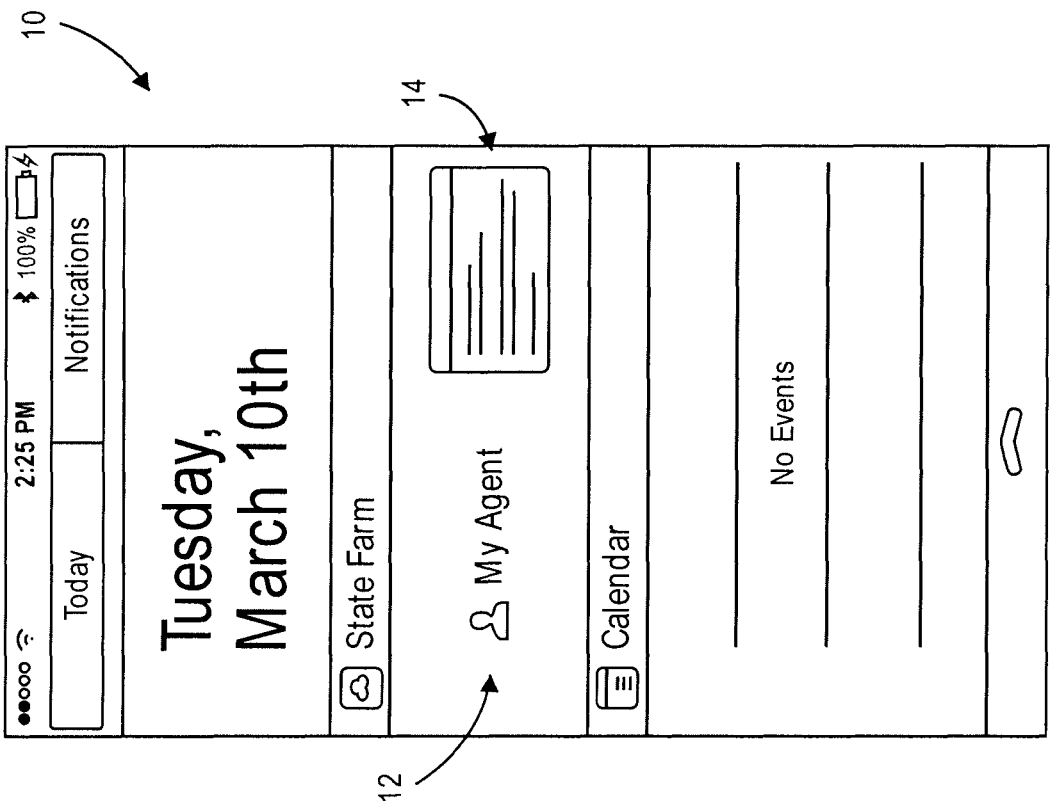
FIG. 1 illustrates an exemplary screen capture of a mobile electronic device with a first operating system platform depicting a computer program including a first software widget and a second software widget, the computer program providing access to auto insurance information.
Figure 8:
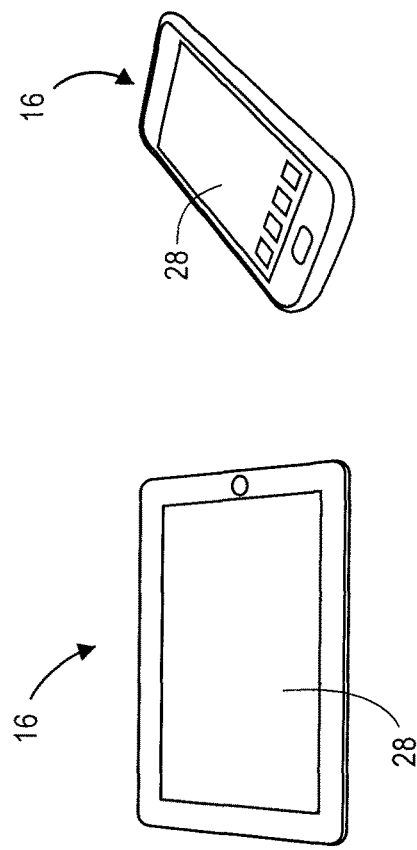
FIG. 8 illustrates examples of the mobile electronic device with which the computer program could be implemented.
Figure 9:
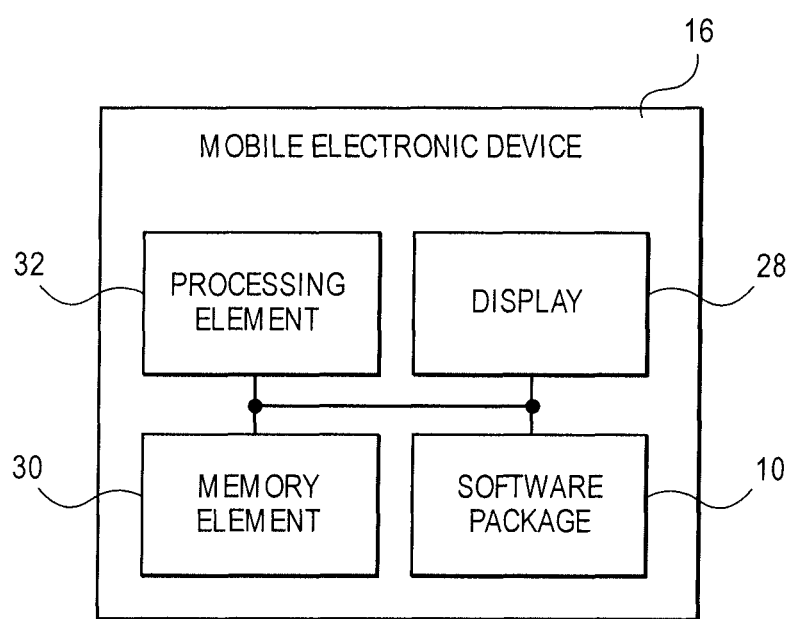
FIG. 9 illustrates various exemplary components of the mobile electronic device shown in block schematic form.

FIGS. 1-3 depict an exemplary computer program 10 for providing access to auto insurance information. The computer program 10 may broadly comprise a first software widget 12 and a second software widget 14. The computer program 10 may be stored in non-transitory computer-readable media and may be implemented, executed, or run on a mobile electronic device 16, as shown in FIGS. 8 and 9.

The first software widget 12, as seen in FIGS. 1-3, may include a photo or image of the user's insurance agent, or a blank silhouette if no image is provided. The first software widget 12 may also include a display of the name of the user's insurance agent. When selected, the first software widget 12 may display a first information screen 18, shown in FIG. 4, that may provide contact information for the user's insurance agent. The contact information may include a photo, a phone number, a mailing address, an email address, and the like. The first information screen 18 may further include options or objects that allow the user to call or email the agent.

The second software widget 14, as seen in FIGS. 1-3, may include a generic or pseudo representation of an auto insurance card, such as a virtual auto insurance card. The representation may include an outline of a card with horizontal lines to symbolize the text of an actual insurance card. When selected, the second software widget 14 may display a second information screen 20, shown in FIG. 5, that may include an image of the user's automobile insurance card. The automobile insurance card may typically include information about the insured vehicle, such as the year, make, model, and vehicle identification number (VIN), as well details of the coverage of the user's automobile insurance policy, such as effective dates, coverage options, deductibles, limits on claims, and the like. Alternatively, the second information screen 20 may display all of the information on the auto insurance card in a list or table form. The second information screen 20 may further include an option or object that allows the user to log in through a software application or web browser to a server operated by the insurance company. Logging in may permit the user to view the proof of insurance, if additional information is needed.

When implemented on a mobile electronic device 16 utilizing the iOS operating system platform from Apple® Inc. of Cupertino, Calif., the first and second software widgets 12, 14 may appear on a screen under the "Today" tab in the "Notifications Center", as seen in FIG. 1. The first and second software widgets 12, 14 may appear under the "Today" tab everyday if the user adds the widgets 12, 14 to the "Today" screen. When implemented on a mobile electronic device 16 utilizing the Android™ operating system platform from Google Inc. of Mountain View, Calif., the first and second software widgets 12, 14 may appear on a home screen, as seen in FIG. 2.

Additionally, or alternatively, with either platform, the first and second software widgets 12, 14 may appear on a first screen of a software application 22, shown in FIG. 3. The software application 22 may provide access to automobile insurance information and may allow the user to adjust his coverage, pay a premium, or file a claim. An exemplary software application 22 includes the Pocket Agent® mobile app from State Farm® of Bloomington, Ill. The first screen of the software application 22 may also include an object or option for the user to log in to a server operated by the insurance company to view insurance information. The first screen of the software application 22 may further include objects or options for other functions such as getting a quote, requesting roadside assistance, or the like. In various embodiments, the first and second software widgets 12, 14 may be positioned at the bottom of the first screen.

Figure 6:
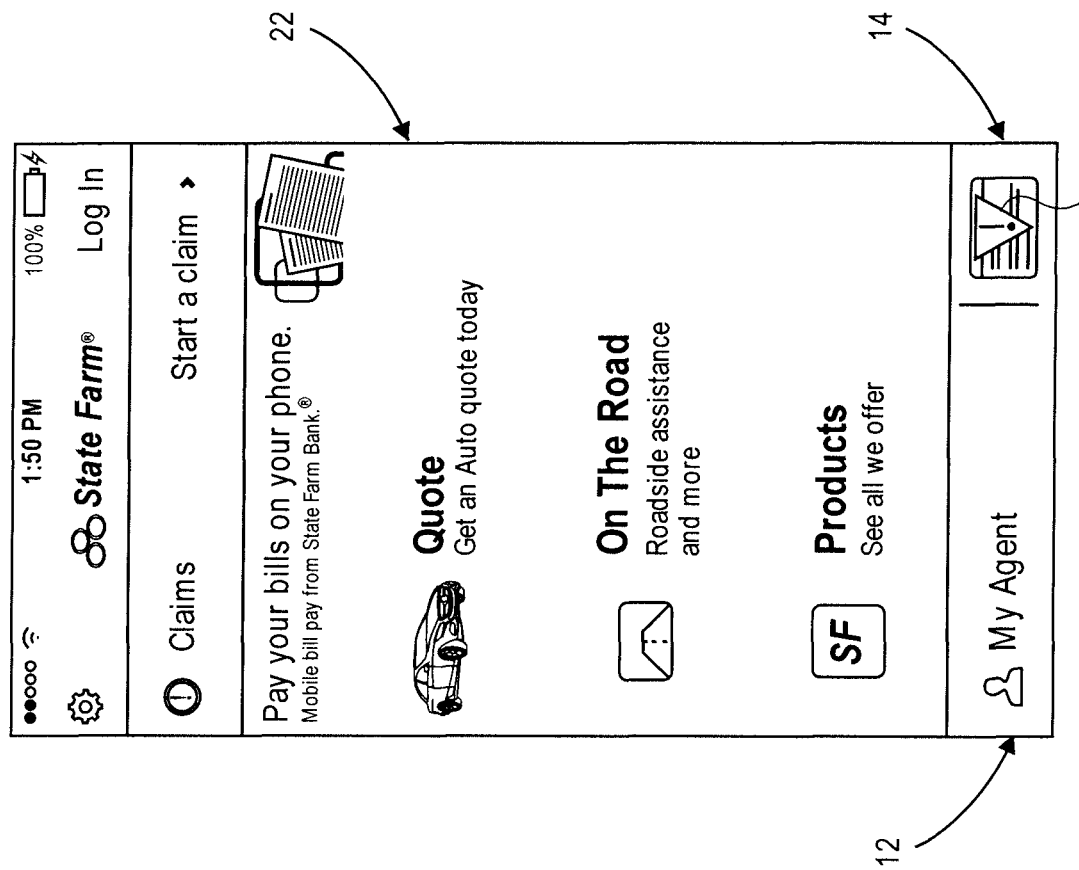
FIG. 6 illustrates an exemplary screen capture from the mobile electronic device depicting a first indicia over laid on the second software widget.

The second software widget 14 may also generate a first indicia 24, shown in FIG. 6, which may indicate that the user's automobile insurance card no longer shows valid data. For example, the automobile insurance card may display time-dependent data, such as the dates for which the policy is in effect. The first indicia 24 may simply indicate that a new image of the automobile insurance card is required and not necessarily that the policy has expired.

The second software widget 14 may periodically, such as once per day, check at least a portion of the data shown on the automobile insurance card. For example, the second software widget 14 may compare the effective end date of the auto insurance policy with the current date. If the effective end date for the policy is earlier than the current date, then the second software widget 14 may generate and position the first indicia 24 on top of, or overlayed on, the image of the second software widget 14 to indicate that there is an issue with the auto insurance card information. If the user selects the first indicia 24, then the second software widget 14 may display a third information screen 26, shown in FIG. 7, that includes the image of the user's automobile insurance card along with an indication, such as the word "Expired", that some information of the card is no longer valid. The third information screen 26 may also include one or more additional objects that allow the user to log in to his account and update the image of the automobile insurance card.

Exemplary Mobile Electronic Device

FIGS. 8 and 9 depict an exemplary mobile electronic device 16 on which the first and second software widgets 12, 14 are implemented, executed, or run. The mobile electronic device 16 may be embodied by a smart watch, a smart phone, a tablet, a laptop computer, or the like and may broadly comprise a display 28, a memory element 30, and/or a processing element 32.

The display 28 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. The display 28 may possess a square or a rectangular aspect ratio and may be viewed in either a landscape or a portrait mode. In various embodiments, the display 28 may also include a touch screen occupying the entire screen or a portion thereof so that the display 28 functions as part of a user interface. The touch screen may allow the user to interact with the mobile electronic device 16 by physically touching, swiping, or gesturing on areas of the screen.

The memory element 30 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 30 may be embedded in, or packaged in the same package as, the processing element 32. The memory element 30 may include, or may constitute, a "computer-readable medium". The memory element 30 may store the first and second software widgets 12, 14 as well as instructions, code, code segments, software, firmware, programs, applications, apps, services, daemons, or the like that are executed by the processing element 32. The memory element 30 may also store settings, data, documents, sound files, photographs, movies, images, databases, and the like.

The processing element 32 may include processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 32 may generally execute, process, or run instructions, code, code segments, software, firmware, programs, applications, apps, processes, services, daemons, or the like. The processing element 32 may also include hardware components such as finite-state machines, sequential and combinational logic, and other electronic circuits that can perform the functions necessary for the operation of the current invention. The processing element 32 may be in communication with the other electronic components through serial or parallel links that include address busses, data busses, control lines, and the like. The processing element 32 may execute the computer program 10 including the first and second software widgets 12, 14.

Exemplary Computer-Implemented Method

Figure 10:
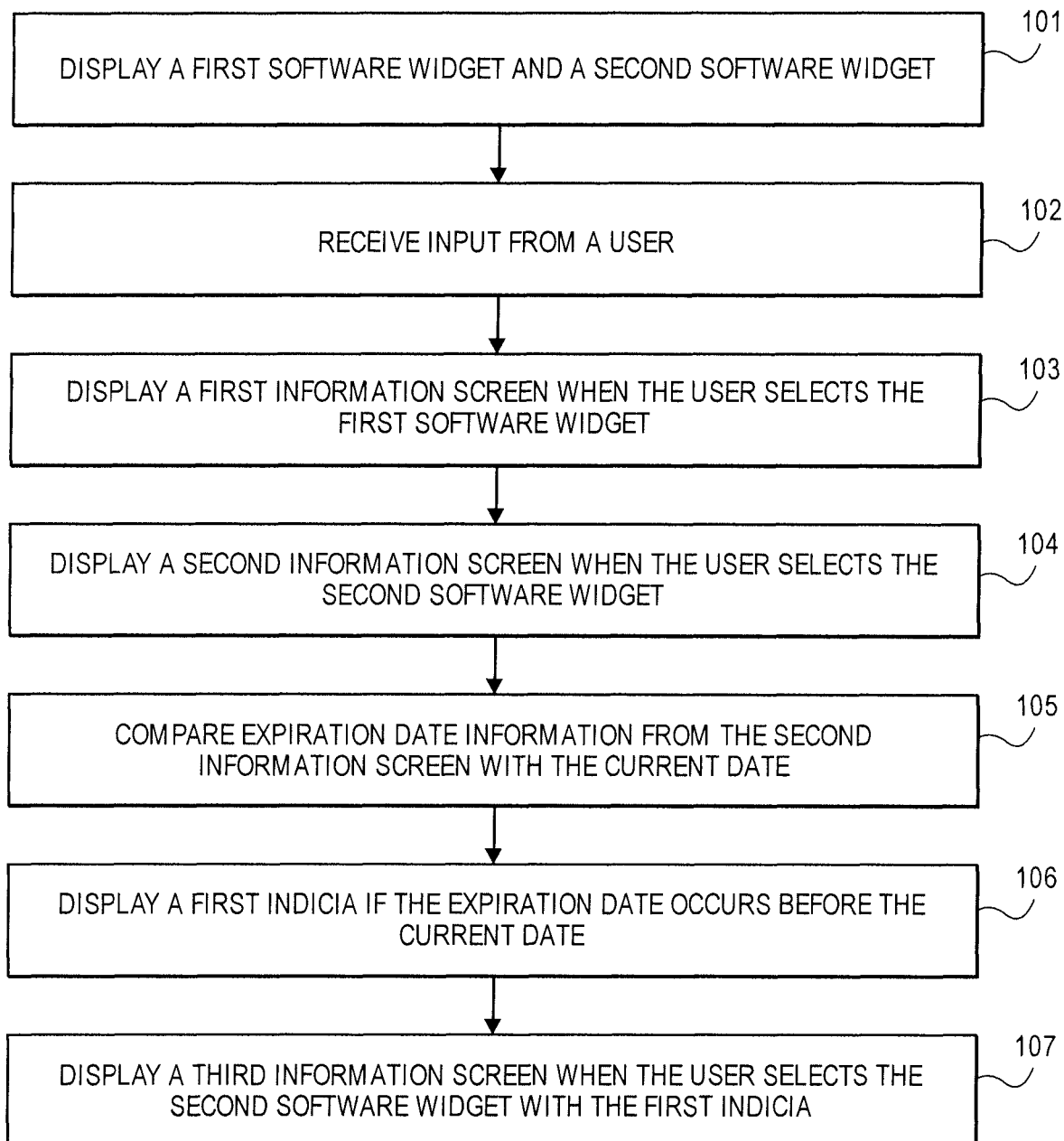
FIG. 10 illustrates at least a portion of the steps of an exemplary computer-implemented method for providing access to auto insurance information.

FIG. 10 depicts a listing of at least a portion of the steps of an exemplary computer-implemented method 100 for providing access to auto insurance information. The steps may be performed in the order shown in FIG. 10, or they may be performed in a different order. Furthermore, some steps may be performed concurrently as opposed to sequentially. In addition, some steps may be optional. The steps of the computer-implemented method 100 may be performed by the mobile electronic device 16.

Referring to step 101, a first software widget 12 and a second software widget 14 may be displayed on a display 28 of a mobile electronic device 16. The mobile electronic device 16 is generally retained by a user and may be embodied by a smart watch, a smart phone, a tablet, a laptop computer, other mobile device or computing device, or the like. As seen in FIGS. 1-3, the first software widget 12 may include a photo or an image of the user's insurance agent, or a blank silhouette if no image is provided. The first software widget 12 may also include a display of the name of the user's insurance agent. The second software widget 14 may include a generic or pseudo (or virtual) representation of an auto insurance card. The representation may include an outline of a card with horizontal lines to symbolize the text of an actual insurance card.

The first and second software widgets 12, 14 may appear on a screen under the "Today" tab in the "Notifications Center", as seen in FIG. 1, of an iOS mobile electronic device 16 or on a home screen, as seen in FIG. 2, of an Android™ mobile electronic device 16. Additionally, or alternatively, with either platform, the first and second software widgets 12, 14 may appear on a first screen of a software application 22, as seen in FIG. 3.

Referring to step 102, input from the user is received. The user may select or activate either the first software widget 12 or the second software widget 14 by touching the image of the appropriate widget 12, 14 on a touchscreen, clicking either widget 12, 14 with a mouse, or the like.

Referring to step 103, a first information screen 18 may be displayed when the user selects the first software widget 12. The first information screen 18, shown in FIG. 4, provides contact information for the user's insurance agent. The contact information may include a photo, a phone number, a mailing address, an email address, and the like. The first information screen 18 may further include options or objects that allow the user to call or email the agent.

Referring to step 104, a second information screen 20 may be displayed when the user selects the second software widget 14. The second information screen 20, shown in FIG. 5, may include an image of the user's automobile insurance card. The automobile insurance card typically may include information about the insured vehicle, such as the year, make, model, and vehicle identification number (VIN), as well details of the coverage of the user's automobile insurance policy, such as effective dates, coverage options, limits on claims, and the like. Alternatively, the second information screen 20 may display all of the information on the auto insurance card in a list or table form. The second information screen 20 may further include an option or object that allows the user to log in through a software application or web browser to a server operated by the insurance company.

Referring to steps 105 and 106, expiration date information from the second information screen 20 may be compared with the current date. The expiration date information may be derived from the effective policy dates listed on the auto insurance card. The second software widget 14 may periodically, such as once per day, check the expiration date. If the expiration date for the policy is earlier than the current date, then the second software widget 14 may generate and position the first indicia 24 on top of, or overlayed on, the image of the second software widget 14, as seen in FIG. 6, to indicate that there is an issue with the auto insurance card information.

Referring to step 107, a third information screen 26 may be displayed when the user selects the second software widget 14 with the first indicia 24. The third information screen 26, shown in FIG. 7, may include the image of the user's automobile insurance card along with an indication, such as the word "Expired", that some information of the card is no longer valid.

Exemplary Computer Program for Providing Access to Auto Insurance Information

In a first aspect, a computer program for providing access to auto insurance information may be provided. The computer program may comprise a first software widget and a second software widget. The first software widget may appear on a display of a mobile electronic device. When selected by a user, the first software widget may display a first information screen that includes a phone number and a mailing address for an insurance agent of the user. The second software widget may appear on the display. When selected by the user, the second software widget may display a second information screen that includes an image of an auto insurance card of the user. The computer program may include additional, less, or alternate functionality, including that discussed elsewhere herein.

For instance, the first software widget may include a name and an image of the insurance agent of the user. The first information screen may further include an email address of the insurance agent of the user. The second software widget may include a generic representation of an auto insurance card. The second software widget may compare an expiration date from the second information screen with the current date and generate a first indicia if the expiration date occurred before the current date. The software widgets may be computer-readable or computer-executable instructions, computer applications, and/or computer-executable instruction modules stored on non-transitory computer-readable media or medium.

Exemplary Computer-Implemented Method for Providing Access to Auto Insurance Information In another aspect, a computer-implemented method for providing access to auto insurance information may be provided. The method may include: (1) displaying a first software widget and a second software widget on a display of a mobile electronic device; (2) receiving input from a user; (3) displaying a first information screen when the user selects the first software widget; (4) displaying a second information screen when the user selects the second software widget; (5) comparing expiration date information from the second information screen with the current date (or otherwise determining that the expiration date has passed and/or that the user's virtual auto insurance card needs to be updated); and/or (6) displaying a first indicia if the expiration date occurred before the current date. The method may include additional, fewer, or alternative actions, including those discussed elsewhere herein.

For instance, the method may include: displaying a third information screen when the user selects the second software widget with the first indicia. The first software widget may include a name and an image of the insurance agent of the user. The first information screen may further include an email address of the insurance agent of the user. The second software widget may include a generic or virtual representation of an auto insurance card.

Exemplary Computer-Readable Medium for Providing Access to Auto Insurance Information In another aspect, a computer-readable medium for providing access to auto insurance information may be provided. The computer-readable medium may include an executable program stored thereon, wherein the program instructs a processing element of a mobile electronic device to perform the following actions: (1) displaying a first software widget and a second software widget on a display of a mobile electronic device; (2) receiving input from a user; (3) displaying a first information screen when the user selects the first software widget; (4) displaying a second information screen when the user selects the second software widget; (5) comparing expiration date information from the second information screen with the current date; and/or (6) displaying a first indicia if the expiration date occurred before the current date. The program stored on the computer-readable medium may instruct the processing element to perform additional, fewer, or alternative actions, including those discussed elsewhere herein.

For instance, the program may instruct the processing element to: display a third information screen when the user selects the second software widget with the first indicia. The first software widget may include a name and an image of the insurance agent of the user. The first information screen may further include an email address of the insurance agent of the user. The second software widget may include a generic representation of an auto insurance card.

Figure 11:
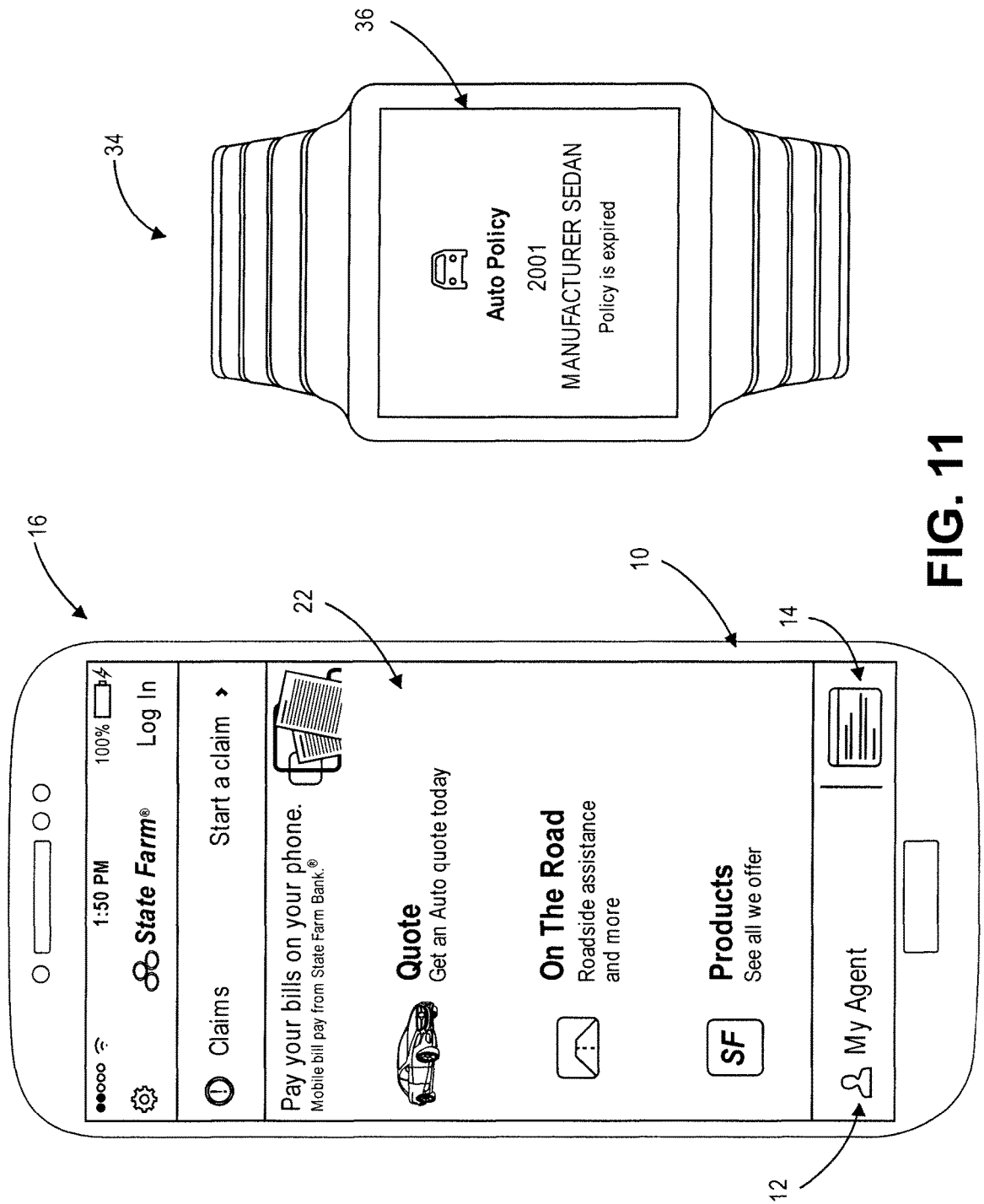
FIG. 11 illustrates a configuration of a smart watch interacting with the mobile electronic device to provide access to auto insurance information.

Exemplary Smart Watch and Mobile Electronic Device Configuration for Providing Access to Auto Insurance Information FIG. 11 depicts an exemplary configuration of a smart watch 34 interacting with the mobile electronic device 16 to provide access to auto insurance information. The mobile electronic device 16 is embodied by a smart phone in FIG. 11, although the mobile electronic device 16 may be embodied by other devices such as personal digital assistants, tablets, laptop computers, and the like. The smart watch 34 is a mobile electronic device 16 and thus, includes the memory element 30 capable of storing widgets, apps, and the like, and the processing element 32 capable of executing or running widgets, apps, and the like. The smart watch 34 and the mobile electronic device 16 may each also include components or electronic circuitry for wireless communication compliant with communication standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof. During operation, the smart watch 34 may maintain wireless communication with the mobile electronic device 16 utilizing Bluetooth™ communication protocols, sometimes referred to as "pairing".

The smart watch 34 may include or execute a second software application 36 that when activated, or tapped, communicates with the mobile electronic device 16. In response, the mobile electronic device 16 may launch, run, or execute the software application 22, which may allow the user access to confidential or proprietary information, such as insurance account information. An example of the software application 22 is the Pocket Agent® mobile app. If the user utilizes the software application 22 to log in to his account, servers operated by the insurance company may authenticate the user upon log in and communicate an authentication token to the mobile electronic device 16. In turn, the mobile electronic device may communicate the authentication token to the smart watch 34. At this point, the user may be able to access insurance information from either the smart watch 34 or the mobile electronic device 16, as both devices have been authenticated. If the smart watch 34 goes out of wireless communication range from the mobile electronic device 16, then the smart watch 34 may not be able to access insurance information but it will remain authenticated and can access insurance information once it returns to the wireless communication range with the mobile electronic device 16. Both the smart watch 34 and the mobile electronic device 16 may remain authenticated unless there is no activity on the software application 22 for a time period, such as 15 minutes. In this case, the software application 22 may unauthenticate, or "log out", the user so that the user can no longer access confidential information on the servers.

Figure 7:
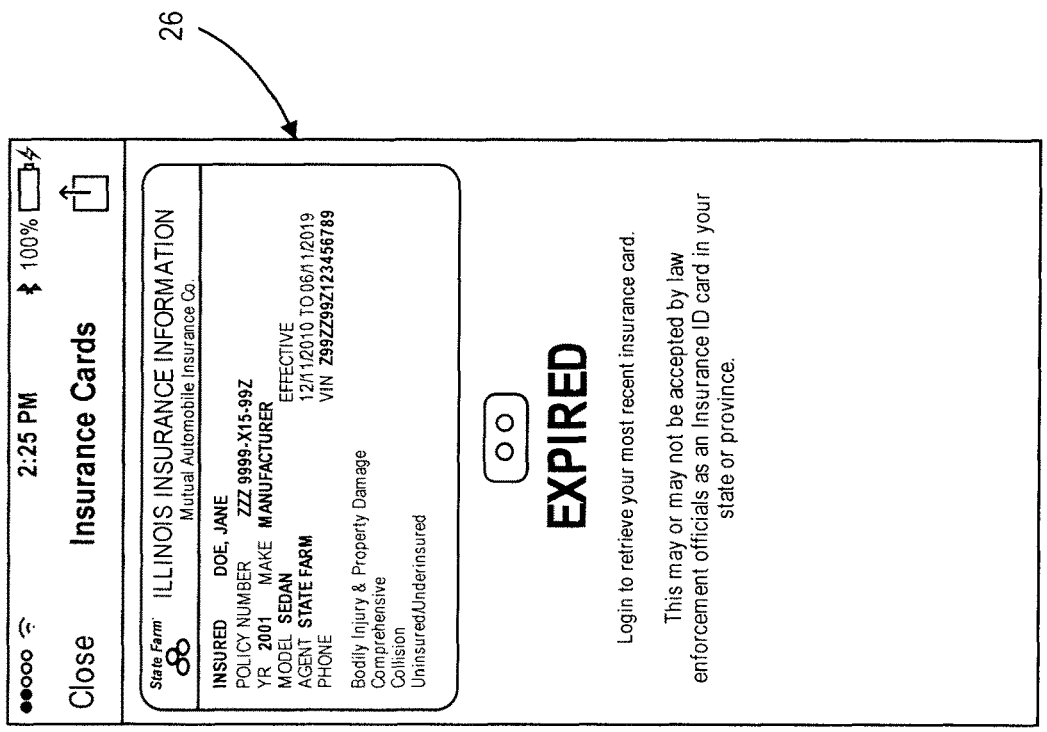
FIG. 7 illustrates an exemplary screen capture from the mobile electronic device depicting a third information screen that is displayed when the second software widget and the first indicia are selected.

The software application 22 executing on the mobile electronic device 16 may push data to the smart watch 34, even though the user may not be actively using the software application 22. For example, the software application 22 may communicate a notice to the smart watch 34 that the user's auto insurance card information is out of date, that it is time to pay a premium, or the like. The second software application 36 may receive the notices or data from the software application 22 and may show an indication on the display of the smart watch 34. The user may notice the indication and may tap or otherwise activate the second software application 36, which communicates with the software application 22. In response, the software application 22 may present the appropriate information screen, such as the third information screen 26, as shown in FIG. 7, on the display 28 of the mobile electronic device 16.

The second software application 36 may include an image of the relevant object, such as a car for auto insurance, a house for homeowners, etc., along with descriptive text and relevant data, such as the year, make, and model for an automobile. Alternatively, or additionally, the second software application 36 may include account data such as an insurance policy number, or at least a portion thereof. The user may be able to tap the second software application 36 at any time to activate the software application 22 on the mobile electronic device 16.

In one aspect, a mobile device (e.g., smart phone) 16 and a smart watch 34 may operate as a system or local wireless communication network. The system may use certain trigger events to (a) allow the smart watch (or smart watch application) 34 to log-into, and/or log-out of, a secure application running on the mobile device 16, and/or (b) allow the smart watch (or smart watch application) 34 to get authenticated or maintain authentication with the mobile device/mobile device application 16. In some embodiments, the mobile device application may include a 15 minute timeout such that if there is no wireless communication between the smart watch 34 and mobile device application for 15 minutes or if the smart watch 34 and mobile device 16 are outside of Bluetooth communication range of one another, the smart watch application may be logged out, or otherwise unauthenticated.

In one embodiment, a user may have secure applications on both their mobile device 16 and smart watch 34 for communicating and displaying insurance, financial, or other information to the user. Initially, the smart watch application may not be authenticated with the mobile device application. The user may tap on either the mobile device 16 or smart watch 34 application-related icon. This may bring up an authentication page on the smart watch application, which may include functionality that allows the user to wirelessly communicate with, or authenticate with, the mobile device application, such as via a virtual token. After which, the smart watch application may remain authenticated with the mobile device 16 until there is a timeout due to an extended period without interaction between the two devices 16, 34, and/or until the two devices 16, 34 are no longer within wireless communication range of one another (e.g., out of Bluetooth range).

In some aspects, the mobile device 16 may push wireless notifications to the smart watch 34 application after authentication, such as notifications that a user's auto insurance card has expired and/or other notifications, including those discussed elsewhere herein. A notification may present an associated icon on the smart watch 34. By tapping on the icon displayed on the smart watch 34, information may be downloaded to the mobile device 16, or even the smart watch 34, such as information associated with a new virtual auto insurance card as described herein.

Exemplary Features

The present embodiments may include several features, including those listed directly below.

A. New Feature Advertisement

In one embodiment, an insurance customer may receive a new feature advertisement as soon as they launch a new version of Pocket Agent® (from State Farm) for the first time. When there is more than one feature, the customer may be able to swipe through for a high level overview on each new item. A view pager may show the user that there are multiple screens to view. The customer may close out of the new feature, and then land on an unauthenticated home page. After which, the customer may only see each new feature advertisement one time. From then on, the customer may only see the screens again when the insurance provider has new features to advertise that the customer has not seen yet.

B. Authenticated Home Page: One Tap Access to Insurance Cards

Customers may be able to access their virtual insurance card directly from their home page. For instance, an authenticated home page may provide one tap access to insurance cards. Once logged in, customers may be able to access their virtual insurance card directly from their home page using the insurance card icon on the bottom bar (or agent bar) (see, e.g., bottom of FIG. 3). This may open the Insurance Card Screen (see, e.g., FIG. 5), from which customers may be able to scroll through all of their insurance cards, as well as access their proof of insurance.

C. Settings: Pocket Agent® Settings

Customers may be able to access the new Pocket Agent® Settings to opt-in for access to their insurance card(s) and/or insurance agent information when they are logged out and/or set their preference(s) to receive local notifications for expired insurance cards, as well as access the change password flow.

Information may also be accessible from an unauthenticated home screen. For instance, from the Pocket Agent® home screen, a customer may be able to access their Settings by tapping on a gear (or other) icon in the upper left hand corner (see, e.g., FIG. 3). A customer may access Settings when they are logged in or logged out.

An unauthenticated Settings screen may be utilized. For instance, when a customer accesses Settings, they may see the option to display their agent details and/or insurance card when they are not logged in. This preference may not be turned on unless the customer is logged in.

A customer may log in to turn on a preference. For example, if a customer attempts to turn on their preference from the unauthenticated Settings screen, they may be immediately prompted to log in. Once the customer is successfully authenticated, their preference may be turned on. The information saved to the mobile device may then be from that point in time. A customer does not have to have auto insurance policies to turn this preference on. For instance, a non-auto insurance customer (e.g., homeowners, rental, life, health, etc.) may only see their Agent Details when they are not logged in.

An Expired Insurance Card Notifications option may be turned on. If a customer opts in for the logged off display of their information, the customer may also be able to select their preference to receive local notifications when their saved virtual insurance cards are expired. The preference for local notifications may be available for auto insurance customers only in some embodiments.

Additionally or alternatively, preferences may be turned off. A customer may opt-out of these preferences when they are logged in or logged out by accessing the Settings screen. A customer may need to confirm that he or she wants to turn off their preference(s). After tapping OK, the customer's preference(s) will be turned off, their saved insurance card and agent details will be removed from the mobile device, and/or they may no longer have access to the saved insurance card when they are logged out. The expired insurance card notifications may also be cleared from the mobile device.

D. Settings: Display Agent Details and Insurance Card when Logged Out

After a customer opts-in to display their agent details and/or insurance card when they are logged out, they may immediately be able to access this information from their unauthenticated home screen. Once a customer logs out, they may notice their agent details and/or insurance card are still accessible from the bottom bar (or agent bar) (see, e.g., bottom of FIG. 3). The information stored on their mobile device may be only as current as the last time the customer successfully logged in. Logging in to Pocket Agent® may refresh the data stored on the device.

Additionally, tapping on their Agent icon may open the Agent detail screen the same as it would if they were logged in (see, e.g., FIGS. 3 and 4). The customer may have all the same functionality to look at their agent details as they would if they were logged in. The customer may use the email, phone, and/or map functionalities as long as they have WiFi or network access.

Figure 5:
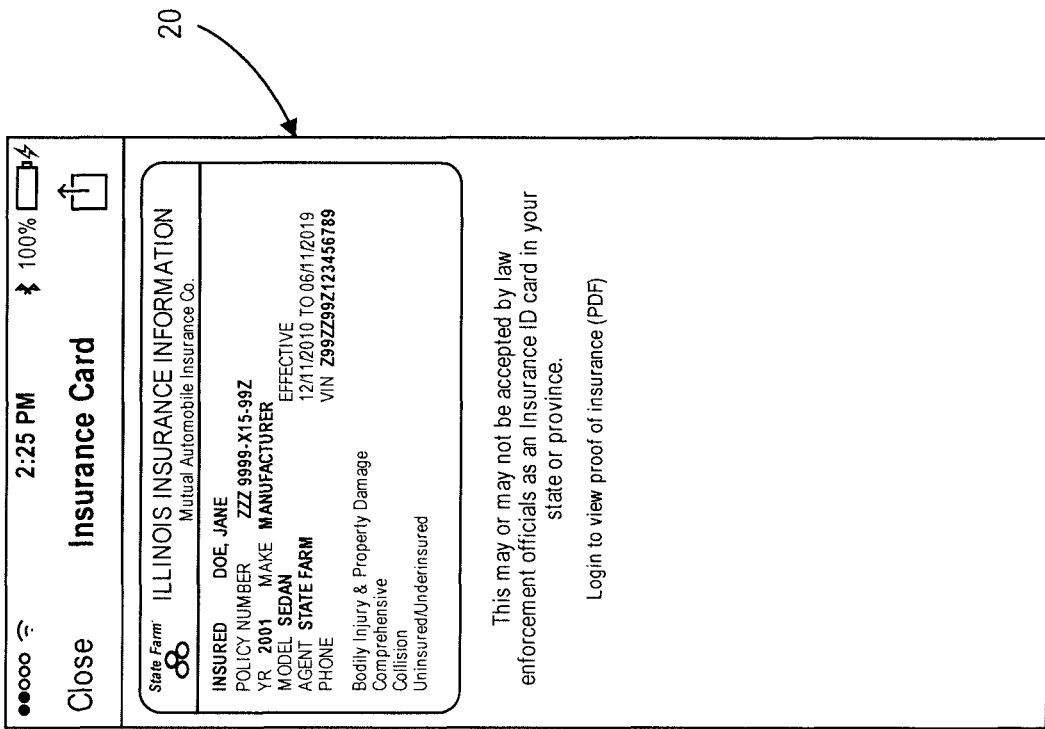
FIG. 5 illustrates an exemplary screen capture from the mobile electronic device depicting a second information screen that is displayed when the second software widget is selected.

Furthermore, tapping on the insurance card icon 14 (bottom of FIG. 3) may open the Insurance Card screen (FIG. 5). If the customer has more than one insurance card available, they may be able to swipe between the cards using the view pager to view them all. The customer may utilize the sharing feature to email or message their insurance card as long as they have WiFi or network access. The customer may be required to log in to access their proof of insurance. After successful log in, the customer's virtual insurance card may be displayed.

E. Settings: Display Agent Details and Insurance Card when Logged Out—Expired Insurance Card Even if the customer is not logged in, it still may be clearly indicated that they have an Expired insurance card stored on their device. For instance, when a customer has an expired insurance card saved to their mobile device, they may see a warning icon 24 on the insurance card 14 on their home page when they are not logged in (see, e.g., FIG. 6).

Also, tapping on the virtual insurance card may open an Insurance Card screen and the customer will be scrolled to the first expired card (see, e.g., FIG. 7). The customer may be able to retrieve their updated insurance cards with the effective 'good to' date indicated on their expired insurance card. The customer may log in to retrieve their most current ID cards. The new card may be displayed and the new card information may be stored to the mobile device. If there is no new policy information available, there may be no card available to display. Also, if the auto policy information available is still the old data, the card may continue to display as Expired even when the customer is logged in. The customer may be prevented from accessing a View proof of insurance link when their insurance card is expired.

F. Settings: Turn on Local Notifications for Expired Insurance Cards iOS auto insurance customers may have the ability to turn on Local Notifications to be notified when their saved insurance card(s) have expired (or are about to expire). An auto insurance customer may have opted in to access their insurance card when they are not logged in, and may be able to turn on local notifications. A customer may turn on notifications for expired insurance cards whether they are logged in or logged out (as long as they had previously logged in to turn on saved data). Users may be prompted to confirm notifications the first time they turn them on. There may be a difference in the flow across iOS operating systems, and the user may receive different messaging based upon operating system.

To begin receiving notifications from Pocket Agent®, a customer must ensure that they have turned on Pocket Agent® notifications in their Device Settings. From the settings menu, the customer may tap on Notifications, scroll until they locate Pocket Agent®, and make sure they are allowing notifications for Pocket Agent®. Customers may tailor local notifications to their preference (Badges, Banners, Alerts, etc.).

When the customer's insurance cards that are saved to the device expire, they may receive a notification (in the manner selected in their Device Settings) informing them that their cards are expired, and that they should log in to update their stored cards. This notification may remain in the notification center pull-down based upon the preference selected in the mobile device settings. Tapping on the notification may launch Pocket Agent® and/or prompt the customer to log in. After logging in, the notification(s) may be cleared from the notification center. If a customer has multiple expired cards, one log in may clear all notifications, as all stored data will be refreshed, and a new expiration date will be set. An image may illustrate a Banner style alert, or a Badged app icon (the badge may display an alert in some embodiments). An alert may be displayed if the notification is triggered when the customer is actively using Pocket Agent®, and they are not logged in.

G. Today Widgets: Add Widget to Today View iOS8 customers may have the ability to access their agent details and/or insurance card by adding the widget to the 'Today' section of their device Notification Center. A customer may pull down their notification center at any time, whether they are actively using an application or not. The Notification view and/or Today view may also be accessed from the lock screen depending upon the customer's settings. The customer may need only to swipe down from the top of their device to access the Notification Center. iOS8 users may be able to tap on the Today tab to open the Today Widgets. After the new version of Pocket Agent® is installed, the customer may see that they have a New Widget Available. The customer may tap the Edit button to add the Pocket Agent® widget to their Today view.

The Notification Center Today View may have an Edit Mode. Once the customer has the Today view in Edit mode, they may be able to see the new widget that they can add. Tapping a green plus sign (or other) icon may add the widget. The customer may use the drag and drop feature (3 horizontal lines) to move the placement of the new widget in their Today view. The customer may tap the Done button when they are finished adding the widget.

Once added, the iOS Today widget may work as a shortcut to access agent details and insurance cards. Tapping on the agent and/or insurance card widget may launch Pocket Agent®, and/or direct the person directly to that screen. Customers don't have to have insurance to access the widgets, but they may receive an error message when they attempt to use it.

H. Touch ID: Enable Touch ID iOS customers may have the ability to use Touch ID (finger print recognition) technology to log into Pocket Agent®. A customer may continue to see the current log in screen unless they meet all of the criteria to enable Touch ID for Pocket Agent®. This criteria may include the following: (i) mobile device supports Touch ID, meaning it has a fingerprint sensor on the Home Button (i.e., iPhone 5s and newer, iPad Air 2 and iPad Mini 3 and newer); (ii) the mobile device has iOS8 or newer operating system; (iii) the customer must have a mobile device passcode set (such as have Passcode turned on in their mobile device settings, meaning a passcode is required to unlock their device); and/or (iv) the customer must have Touch ID enabled on their mobile device by registering at least one finger print.

The Log In Screen may be used with Touch ID turned off. For instance, if a customer has met all of the criteria mentioned directly above, they may see the Enable Touch ID toggle on the log in screen the next time they open Pocket Agent®.

Additionally or alternatively, the Log In Screen may be used with Touch ID disabled. For instance, if a customer turns off the Remember my User ID toggle, the Enable Touch ID option may become disabled. Enable Touch ID may only be used if Remember my User ID is turned on.

The Log In Screen may also be used with Touch ID turned on. For instance, after the customer turns on Enable Touch ID, the customer may receive a prompt. This prompt may instruct the customer that they must manually log in (enter their password) one time in order for Touch ID to become active for Pocket Agent®.

I. Touch ID: Log in with Touch ID

A customer may log in with Touch ID. After tapping OK on the Enable Touch ID prompt, the customer may manually enter their password one time to log in (this saves the customer's password (such as a password to access a website associated with an insurance provider and/or insurance policy information) to the mobile device, allowing it to be retrieved by Touch ID the next time the customer logs in.). If proofing is required, the customer may continue through the verification process to successfully authenticate. If the customer were to log out, and then tap log in from the unauthenticated home page, the customer may be immediately prompted with the Touch ID option for their next log in. This may be the screen that the customer will be immediately prompted with each time they open Pocket Agent® when Touch ID is enabled. If the customer taps on Enter Password or Cancel, they may be returned to the log in screen to type in their password. If the customer wants to bring the Touch ID prompt back, they may tap the new finger print icon in the top right and provide their finger print using the sensor.

A customer may also log in if Touch ID is not available. If the customer completes any action which deletes the saved password from the mobile device, the customer may not have the option to use Touch ID to log in until they have logged in by typing in their password and successfully authenticated, saving the password to the mobile device once again. This may be required if the customer completes any of the following actions: (i) turns off Remember My Device; (ii) turns off Enable Touch ID; (iii) turns off their Passcode in the device settings; (iv) completely deletes Pocket Agent from the device; and/or (v) submits a different User ID and Password (i.e., if 2 customers share a device).

J. Touch ID: Log in with Touch ID iOS customers may have the ability to use Touch ID (finger print recognition) technology to change their password through the Voluntary Change Password flow within Pocket Agent®. For instance, once a customer is successfully authenticated into Pocket Agent®, they may opt to change their password from the menu. If Touch ID is enabled and active for Pocket Agent®, the customer may be immediately prompted to provide their fingerprint to populate the Current password field.

The customer's current password may be auto-populated on to the Change Password screen after successfully providing their fingerprint. If the customer turns on Show passwords, this may not show the Current Password field if the password was retrieved using Touch ID. The New password and Retype new fields may be the only passwords displayed to the user. The customer may receive confirmation that their password was successfully updated.

Exemplary Insurance Embodiments

In one aspect, home screen Agent and Insurance Card widgets may provide quick access to auto insurance cards and/or list insurance agent contact information on a mobile device home screen. The mobile device may display agent name and insurance card icons side-by-side, provide an insurance card quick link, and/or a full digital insurance card.

A first widget may be a single widget that provides quick access to all insurance cards of a customer. A second widget may list customer agent name, provide quick access to agent information, and/or insurance cards. A third widget may contain the entire insurance card, or multiple cards with agent information.

A virtual auto insurance card may have multiple uses, including digital proof of auto insurance; quick access to an insurance agent (including phone number, driving navigation, and/or fax number); exchange of information in the event of an accident; police officer request; car rental information; loan application; driver license renewal; and/or insurance agent contact information.

The mobile device may display virtual representations of an insurance agent and insurance card in the same area of a screen to provide association of the agent with the insurance card. Tapping the mobile device screen on an agent widget may show more information about an agent and/or list multiple agents. Tapping the mobile device on an insurance card widget may show more information about or associated with the insurance card or associated insurance policy.

An insurance provider remote server may send a reminder to a customer to log-in to their account and update the virtual auto insurance card stored on their mobile device. For instance, notifications to a customer may be sent via a "Notification Center."

In one aspect, insurance customers may use mobile devices with the iOS8 platform may log into an insurance provider app, such as Pocket Agent®, using their fingerprint. To enable, customers may verify their existing credentials through a standard log in process, and then use Touch ID or other fingerprint recognition software for subsequent log ins.

Exemplary Computer-Implemented Methods

In one aspect, a computer-implemented method of updating a virtual auto insurance card stored on a mobile device may be provided. The method may include: (1) determining, via one or more processors (such as remote processors or servers associated with an insurance provider), that a virtual auto insurance card needs to be updated or re-issued with a new expiration date (such as determining that an expiration date of the virtual auto insurance card (and/or associated auto insurance policy for an insurance customer) is approaching or has passed); (2) generating, via one or more processors, (i) an updated virtual auto insurance card for the insurance customer that has a future expiration date, and/or (ii) an electronic notification indicating to the insurance customer that their existing virtual auto insurance card stored on their mobile device needs to be updated (or has expired), and that the updated virtual auto insurance card for the insurance customer should be downloaded or accessed for storage on their mobile device; (3) transmitting, via one or more processors, the electronic notification to the mobile device of the insurance customer to notify them to download the updated virtual auto insurance card to their mobile device; (4) transmitting, via one or more processors, the updated virtual auto insurance card to the mobile device of the insurance customer when the insurance customer requests access, or otherwise allowing the insurance customer to electronically access the updated virtual auto insurance card; and/or (5) causing, via one or more processors, the updated virtual auto insurance card to be stored on the mobile device of the insurance customer and/or displayed on a display of the mobile device after the mobile device of the insurance customer seeks to access the updated virtual auto insurance card to facilitate maintaining virtual auto insurance cards up-to-date for insurance customers. The method may include additional, less, or alternate actions, including those discussed elsewhere herein, and/or may be implemented a computer system, communication network, one or more local or remote processors or servers (such as an insurance provider remote server and/or an insurance customer's mobile device), and/or computer-executable instructions stored on non-transitory storage media or computer-readable medium.

For instance, the method may include (a) generating, via one or more processors, an auto insurance card widget; (b) causing, via one or more processors, the auto insurance card widget to be displayed on the mobile device of an insured; and/or (c) allowing, via one or more processors, the insured to download the updated virtual auto insurance card to their mobile device by user operation performed upon the auto insurance card widget and/or an associated auto insurance card icon displayed on the mobile device.

The method may include generating, via one or more processors, an icon indicating that an existing virtual auto insurance card stored on an insured's mobile device needs to be updated (or has expired); and/or causing, via one or more processors, the icon to be displayed on the mobile device and/or superimposed upon the auto insurance card widget when the existing virtual auto insurance card stored on the insured's mobile device needs to be updated (or has expired). The method may also include determining, via one or more processors, that the existing virtual auto insurance card stored on the insured's mobile device needs to be updated (or has expired) by comparing, via the one or more processors, an auto insurance policy expiration date for the customer with a current date, and/or an expiration date contained within the existing virtual representation of the auto insurance card with the current date.

The method may include generating, via one or more processors, an insurance agent widget; causing, via one or more processors, the insurance agent widget to be displayed on the mobile device of an insured; and/or allowing, via one or more processors, the insured to access and/or display on their mobile device insurance agent contact information by, or after, user operation performed upon the insurance agent widget and/or an associated insurance agent icon.

In another aspect, a computer-implemented method of updating a virtual auto insurance card stored on a mobile device may be provided. The method may include (1) generating, via one or more processors (such as remote processors or servers associated with an insurance provider), a virtual representation of an auto insurance card for an auto insurance customer and/or auto insurance policy; (2) transmitting, via one or more processors, the virtual representation of the auto insurance card to a mobile device of the auto insurance customer (and/or causing, via one or more processors, the virtual representation of the auto insurance card to be displayed on the mobile device of the auto insurance customer); (3) monitoring, via one or more processors, an expiration date associated with the virtual representation of the auto insurance card; (4) determining, via one or more processors, that the expiration date is approaching, or has arrived or passed; (5) generating, via one or more processors, (i) an updated virtual representation of the auto insurance card with a new expiration date, and (ii) a notification to the auto insurance customer that they need to access, or otherwise download, the updated virtual representation of the auto insurance card to their mobile device; (6) transmitting, via one or more processors, the notification to the auto insurance customer that they need to access or otherwise download the updated virtual representation to the mobile device of the auto insurance customer; and/or (7) causing, via one or more processors, the updated virtual representation of the auto insurance card with a new expiration date to be presented on the display of the mobile device based upon user input received via the mobile device from the auto insurance customer to facilitate maintaining up-to-date virtual auto insurance cards stored on insurance customers' mobile devices. The method may include additional, less, or alternate actions, including those discussed elsewhere herein, and/or may be implemented a computer system, communication network, one or more local or remote processors or servers (such as an insurance provider remote server and/or an insurance customer's mobile device), and/ or computer-executable instructions stored on non-transitory storage media or computer-readable medium.

For instance, the method may include (a) generating, via one or more processors, an auto insurance card widget; (b) causing, via one or more processors, the auto insurance card widget to be displayed on the mobile device of an insured; and/or (c) allowing, via one or more processors, the insured to download the updated virtual representation of the auto insurance card to their mobile device by, or after, user operation performed upon the auto insurance card widget and/or an associated auto insurance card icon. The method may also include generating, via one or more processors, an icon indicating that an existing virtual representation of the auto insurance card stored on an insured's mobile device needs to be updated (or has expired); and/or causing, via one or more processors, the icon to be displayed on the mobile device and/or superimposed upon the auto insurance card widget when the existing virtual representation of the auto insurance card stored on the insured's mobile device needs to be updated (or has expired).

The method may include determining, via one or more processors, that the existing virtual representation of the auto insurance card stored on the insured's mobile device needs to be updated (or has expired) by comparing an auto insurance policy expiration date for the customer with the current date, and/or comparing an expiration date contained within (or otherwise "on") the existing virtual representation of the auto insurance card with the current date.

The method may include generating, via one or more processors, an insurance agent widget; causing, via one or more processors, the insurance agent widget to be displayed on the mobile device of an insured; and/or allowing, via one or more processors, the insured to access and/or display on their mobile device insurance agent contact information by, or after, user operation performed upon the insurance agent widget and/or associated insurance agent icon.

Exemplary Computer-Implemented Methods & Widgets

In one aspect, a computer-implemented method of updating a virtual auto insurance card stored on a mobile device may be provided. The method may include generating, via one or more processors (such as remote processors or servers associated with an insurance provider), an insurance card widget used to access, download, and/or display a virtual insurance card, such that virtual insurance card may be accessed and stored on a mobile device of an insurance customer. The insurance card widget may be configured to subsequently indicate on a display of the mobile device (such as via a warning icon) that the virtual insurance card has expired (or is about to expire) from an unauthenticated home screen (i.e., the user is not required to log into an account or web site for the mobile device to display the warning that the virtual insurance card stored on the mobile device has expired and that a new virtual insurance card needs to be accessed and downloaded to the mobile device). The method may include additional, less, or alternate actions, including those discussed elsewhere herein, and/or may be implemented a computer system, communication network, one or more local or remote processors or servers (such as an insurance provider remote server and/or an insurance customer's mobile device), and/or computer-executable instructions stored on non-transitory storage media or computer-readable medium.

For instance, the method may include generating, via one or more processors, an insurance agent widget that allows the mobile device to access and/or display insurance agent information. The method may include generating, via one or more processors, an updated virtual insurance card for the insurance customer; and/or allowing, via one or more processors, the mobile device of the insurance customer to access the updated virtual insurance card via the insurance card widget. The method may include determining, via one or more processors or via the insurance card widget, that the virtual insurance card stored on the mobile device of the insurance customer has expired or is about to expire based upon an expiration date or insurance policy end date that is contained within the virtual insurance card, and/or comparison of the expiration or end date with a current date.

In another aspect, a computer-implemented method of updating a virtual auto insurance card stored on a mobile device may be provided. The method may include (1) generating, via one or more processors (such as processors or servers associated with an insurance provider), a virtual insurance card for an insurance customer, the virtual insurance card being associated with an auto insurance policy issued by the insurance provider and/or having an expiration date; and/or (2) generating, via one or more processors, an insurance card widget for download onto a mobile device of the insurance customer, wherein once installed on the mobile device, the insurance card widget allows the mobile device to remotely access the virtual insurance card for storage onto the mobile device and subsequent display on the mobile device. The method may include additional, less, or alternate actions, including those discussed elsewhere herein, and/or may be implemented a computer system, communication network, one or more local or remote processors or servers (such as an insurance provider remote server and/or an insurance customer's mobile device), and/ or computer-executable instructions stored on non-transitory storage media or computer-readable medium.

For instance, the insurance card widget may be further configured to display a warning icon on the display of the mobile device when the virtual insurance card stored on the mobile device is about to expire or has expired (such as based upon comparison of the current date with the expiration date).

In another aspect, a computer-implemented method of updating a virtual auto insurance card stored on a mobile device may be provided. The method may include (1) generating, via one or more processors (such as processors or servers associated with an insurance provider), an original virtual insurance card for an insurance customer, the original virtual insurance card being associated with an auto insurance policy issued by the insurance provider and/or having an expiration date; (2) generating, via one or more processors, an insurance card widget for download onto a mobile device of the insurance customer, wherein once installed on the mobile device, the insurance card widget allows the mobile device to remotely access and/or download the original virtual insurance card for storage onto the mobile device and subsequent display on the mobile device; (3) generating, via one or more processors, an electronic notification for display on a Notification Center screen on the mobile device, the electronic notification indicating to the insurance customer that they have an expired virtual insurance card stored on their mobile device; (4) generating, via one or more processors, an updated virtual insurance card with a new and future expiration date for the insurance customer when the original virtual insurance card expires or is about to expire; and/or (5) allowing, via one or more processors and/or the insurance card widget, the mobile device of the insurance customer to remotely access and/or download the updated virtual insurance card with the new expiration date (for subsequent off line and/or unauthenticated access and display on the mobile device) after the mobile device receives the electronic notification indicating that the customer needs to download a new virtual insurance card. As a result, maintaining a current virtual insurance card stored on insurance customer's mobile devices is facilitated.

The method may include additional, less, or alternate actions, including those discussed elsewhere herein, and/or may be implemented a computer system, communication network, one or more local or remote processors or servers (such as an insurance provider remote server and/or an insurance customer's mobile device), and/or computer-executable instructions stored on non-transitory storage media or computer-readable medium. For instance, the method may include (a) generating, via one or more processors, an insurance agent widget that allows the mobile device to access and/or display insurance agent information; (b) allowing, via one or more processors, the insurance agent widget to be downloaded to the mobile device of the insurance customer; and/or (c) causing, via one or more processors, the insurance agent widget (or associated icon) to be displayed on the mobile device in proximity to the insurance card widget (or associated icon), such as side-by-side, to indicate that the insurance agent virtually represented by the insurance agent widget or icon is associated with the insurance card or policy virtual represented by the insurance card widget or icon.

Additional Exemplary Insurance and Financial Widgets

In one aspect, a widget for displaying and accessing insurance-related information may be provided. The widget may display an icon associated with an insurance provider, and when activated, present an information screen displaying insurance information. The insurance information may, for example, display insurance policy and/or account information, such as auto, homeowners, renters, life, pet, burial, and/or personal articles insurance.

The insurance-related widget may allow insurance customers or potential insurance customers to request and receive insurance quotes, such as requesting a quote for auto or homeowners insurance. For instance, after the widget is activated, an information screen may be shown that allows a user to enter information into certain fields, such as name, address, and/or features of the item (auto, home, etc.) to be insured. After which, an insurance provider remote server may generate a virtual quote for display on the user's mobile device.

The insurance-related widget may allow insurance customers to submit an insurance claim, such as a claim related to auto or homeowners insurance. For instance, after the widget is activated, an information screen may be shown on a mobile device that allows a user to enter information into certain fields, such as name, address, an explanation of an accident, those involved, and/or extent of damage (to an vehicle, home, persons injured, etc.). After which, an insurance provider remote server may receive the virtual insurance claim submitted and start the process of reviewing and/or handling the insurance claim, such as notifying an agent to contact the insurance customer for further information.

In another aspect, a widget for displaying and accessing financial-related information may be provided, such as information related to financial products or services. The widget may display an icon associated with a financial services provider, such as a bank, and when activated, present an information screen displaying financial information. The financial information may, for example, display financial account information, such as bank, credit card, stock, mutual funds, 401K, and/or other financial accounts.

The financial-related widget may allow customers or potential customers to request and receive quotes for loans, loan terms, and/or financing terms, such as requesting a quote for an auto or home loan. For instance, after the widget is activated, an information screen may be shown that allows a user to enter information into certain fields, such as name, address, and/or features of the item (auto, home, etc.) to be purchased using the loan. After which, a financial services provider remote server may generate a virtual quote for financing terms for display on the user's mobile device.

ADDITIONAL EXEMPLARY EMBODIMENTS

In one aspect, a computer program stored on a non-transitory computer-readable medium for displaying insurance and/or financial information may be provided. The computer program may include (1) a first software widget appearing on a display of a mobile electronic device that when selected by a user displays a first information screen including insurance information; and/or (2) a second software widget appearing on the display of the mobile electronic device that when selected by the user displays a second information screen including financial information to facilitate accessing insurance and/or financial information via widgets.

The first software widget, first information screen, and/or insurance information displayed may include (1) insurance policy information for an insurance policy associated with an insured; (2) a quote screen for obtaining an insurance quote (such as auto, homeowners, renters, life, or personal articles insurance quote); and/or (3) a claim screen for entering or submitting an insurance claim (such as an auto, homeowners, renters, life, or personal articles insurance claim). Additionally or alternatively, the first information screen may include an email address, address, phone number, and/or other contact information of the insured or user, or fields for virtually entering such contact information. The first software widget may further include an image of the insurance agent of the user, and/or an email address of the insurance agent of the user, such as discussed elsewhere herein.

The second software widget, second information screen, and/or financial information may include user financial account information and/or updated balances, such as for bank, credit card, savings, mutual funds, stock, or 401K accounts. Additionally or alternatively, the second software widget, second information screen, and/or financial information may include information about, or a means for (such as a computer program or computer-executable instructions), obtaining quotes for vehicle, home, or personal loans.

In another aspect, a computer program stored on a non-transitory computer-readable medium for displaying insurance and/or financial information may be provided. The computer program may include a first software widget appearing on a display of a mobile electronic device that when selected by a user displays a first information screen including insurance-related information or fields for entering insurance-related information; and/or a second software widget appearing on the display of the mobile electronic device, the second software widget displaying a second information screen including an image of one or more financial accounts to facilitate displaying insurance policy and/or financial account information via widgets.

The first software widget or first information screen may allow a user to request and receive a quote for insurance, such as auto, homeowners, renters, life, or personal articles insurance. The first software widget may include an image of the insurance agent of the user, and/or an email address of the insurance agent of the user. The first software widget or first information screen may allow a user to enter and/or submit an insurance claim, such as an auto, homeowners, renters, life, or personal articles insurance claim.

The second software widget, second information screen, and/or financial information may include user financial account information and/or updated balances, such as for bank, credit card, savings, mutual funds, stock, or 401K accounts. The second software widget, second information screen, and/or financial information may include information about, or a means for (such as computer-executable instructions stored on non-transitory computer-readable medium or media), obtaining quotes for vehicle, home, or personal loans.

Exemplary Methods

In one aspect, a computer-implemented method for displaying insurance and/or financial information may be provided. The computer-implemented method comprising: (1) displaying a first software widget and a second software widget on a display of a mobile electronic device; (2) receiving input from a user; (3) displaying a first information screen when the user selects the first software widget, the first information screen displaying insurance policy information associated with insurance policies of the user, and/or other insurance-related information; and/or (4) displaying a second information screen when the user selects the second software widget, the second information screen displaying financial account information associated with financial accounts of the user, and/or other financial service or product information to facilitate providing insurance and financial service or product information to the user. The method may include additional, less, or alternate actions, including those discussed elsewhere herein, and/or may be implemented via one or more local or remote processors and/or computer-executable instructions stored on non-transitory computer-readable medium or media.

For instance, the first software widget, first information screen, and/or insurance information displayed may include (1) insurance policy information for an insurance policy associated with an insured; (2) a quote screen for obtaining an insurance quote (such as auto, homeowners, renters, life, or personal articles insurance quote); and/or (3) a claim screen for entering or submitting an insurance claim (such as an auto, homeowners, renters, life, or personal articles insurance claim). The second software widget, second information screen, and/or financial information may include user financial account information and/or updated balances, such as for bank, credit card, savings, mutual funds, stock, or 401K accounts. Additionally or alternatively, the second software widget, second information screen, and/or financial information may include information about, or a means for (such as processor executable instructions), obtaining quotes for vehicle, home, or personal loans.

In another aspect, a computer-implemented method of providing insurance and/or financial services or products via an insurance-related and/or financial-related widget, respectively, stored on a mobile device may be provided. The method may include (1) generating, via one or more processors, an insurance-related widget for download onto a mobile device of an insurance customer, wherein once installed on the mobile device, the insurance-related widget allows the mobile device to (i) remotely access and/or download insurance policy information for insurance policies of the insurance customer, (ii) remotely request a quote for an insurance product based upon, at least in part, insurance customer and/or insured item information, and then display the quote for insurance customer review, approval, or modification; and/or (iii) remotely prepare and submit an insurance claim associated with an insurance policy of the insurance customer via the mobile device; and/or (2) generating, via one or more processors, an financial-related widget for download onto a mobile device of an insurance customer, wherein once installed on the mobile device, the financial-related widget allows the mobile device to (i) remotely access and/or download financial account information for financial accounts of the insurance customer, (ii) remotely request a quote (or financing terms) for a loan product based upon, at least in part, insurance customer and/or an item covered by the loan (such as a vehicle or home), and then display the quote for insurance customer review, approval, or modification to facilitate providing insurance and/or financial products or services to a customer. Additionally or alternatively, the method may include generating, via one or more processors, an insurance agent widget that allows the mobile device to access and/or display insurance agent information; allowing, via one or more processors, the insurance agent widget to be downloaded to the mobile device of the insurance customer; and/or causing, via one or more processors, the insurance agent widget (or associated icon) to be displayed on the mobile device in proximity to the insurance-related widget (or associated icon) to indicate that the insurance agent virtually represented by the insurance agent widget or icon is associated with an insurance policy virtual represented by the insurance-related widget or icon. The method may include additional, less, or alternate actions, including those discussed elsewhere herein, and/or may be implemented via one or more local or remote processors and/or computer-executable instructions stored on non-transitory computer-readable medium or media.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the language of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims.

The patent claims at the end of this patent application are not intended to be construed under 35 U.S.C. § 112(f) unless traditional means-plus-function language is expressly recited, such as "means for" or "step for" language being explicitly recited in the claim(s).

Having thus described various embodiments of the invention, what is claimed as new and desired to be protected by Letters Patent includes the following:

We claim:

1. A computer program stored on a non-transitory computer-readable medium configured to:
    store auto insurance card information on a mobile electronic device of a user;
    respond to user input by opening a software application to display a first screen on a display of the mobile electronic device;
    display a first software widget including a name and an image of an insurance agent of a user on the first screen that when selected by a user displays a second screen including a phone number and a mailing address for the insurance agent of the user;
    display a second software widget including a generic representation of an auto insurance card on the first screen that when selected by the user displays a third screen including an image of an auto insurance card of the user when the user is not logged into a server of an insurance company associated with the auto insurance card, the auto insurance card having an associated effective end date stored on the mobile device;
    display on the third screen an object that when selected by the user connects the mobile electronic device to the server to permit the user to log into an account of the user on the server;
    periodically compare the associated effective end date of the auto insurance card with a current date;
    generate a first indicia indicating the stored insurance card information is no longer valid if the associated effective end date occurred before the current date;
    display the first indicia on the first screen overlaid on the second software widget;
    display a second indicia on the third screen indicating that at least some of the auto insurance card information is no longer valid if the associated effective end data occurred before the current date;
    receive a notification on the mobile device when the user is not logged into the server if the associated effective end date occurred before the current date;
    based on receiving the notification, receive a selection of the object on the third screen by the user to log into the account of the user on the server;
    receive log in information from the user to log into the server; and
    clear the notification and refresh the auto insurance card information stored on the mobile device to set a new effective end date.

2. The computer program of claim 1, wherein the second screen further includes an email address of the insurance agent of the user.

3. The computer program of claim 1, wherein the second software widget compares the associated effective end date of the auto insurance card with the current date at least once per day.

4. A mobile electronic device, comprising:
    a processing element;
    a display controlled by the processing element, the display having an input device;
    a non-transitory computer readable memory in communication with the processing element, the memory storing a computer program that when executed by the processing element causes the processing element to
    store auto insurance card information on a mobile electronic device of a user;
    respond to user input by opening a software application to display a first screen on a display of the mobile electronic device;
    display a first software widget including a name and an image of an insurance agent of a user on the first screen that when selected by a user displays a second screen including a phone number and a mailing address for the insurance agent of the user;
    display a second software widget including a generic representation of an auto insurance card on the first screen that when selected by the user displays a third screen including an image of an auto insurance card of the user when the user is not logged into a server of an insurance company associated with the auto insurance card, the auto insurance card having an associated effective end date stored on the mobile device;
    display on the third screen an object that when selected by the user connects the mobile electronic device to the server to permit the user to log into an account of the user on the server;
    periodically compare the associated effective end date of the auto insurance card with a current date;
    generate a first indicia indicating the stored insurance card information is no longer valid if the associated effective end date occurred before the current date;
    display the first indicia on the first screen overlaid on the second software widget;
    display a second indicia on the third screen indicating that at least some of the auto insurance card information is no longer valid if the associated effective end data occurred before the current date;
    receive a notification on the mobile device when the user is not logged into the server if the associated effective end date occurred before the current date;
    based on receiving the notification, receive a selection of the object on the third screen by the user to log into the account of the user on the server;
    receive log in information from the user to log into the server; and
    clear the notification and refresh the auto insurance card information stored on the mobile device to set a new effective end date.

5. The mobile electronic device of claim 4, wherein the second screen further includes an email address of the insurance agent of the user.

6. The mobile electronic device of claim 4, wherein the second software widget compares the associated effective end date of the auto insurance card with the current date at least once per day.

7. A method for managing auto insurance card information, comprising:
- storing auto insurance card information on a mobile electronic device of a user;
- responding to user input by opening a software application to display a first screen on a display of the mobile electronic device;
- displaying a first software widget including a name and an image of an insurance agent of a user on the first screen that when selected by a user displays a second screen including a phone number and a mailing address for the insurance agent of the user;
- displaying a second software widget including a generic representation of an auto insurance card on the first screen that when selected by the user displays a third screen including an image of an auto insurance card of the user when the user is not logged into a server of an insurance company associated with the auto insurance card, the auto insurance card having an associated effective end date stored on the mobile device;
- displaying on the third screen an object that when selected by the user connects the mobile electronic device to the server to permit the user to log into an account of the user on the server;
- periodically comparing the associated effective end date of the auto insurance card with a current date;
- generating a first indicia indicating the stored insurance card information is no longer valid if the associated effective end date occurred before the current date;
- displaying the first indicia on the first screen overlaid on the second software widget;
- displaying a second indicia on the third screen indicating that at least some of the auto insurance card information is no longer valid if the associated effective end data occurred before the current date;
- receiving a notification on the mobile device when the user is not logged into the server if the associated effective end date occurred before the current date;
- based on receiving the notification, receiving a selection of the object on the third screen by the user to log into the account of the user on the server;
- receiving log in information from the user to log into the server; and
- clearing the notification and refresh the auto insurance card information stored on the mobile device to set a new effective end date.

8. The method of claim 7, wherein the second screen further includes an email address of the insurance agent of the user.

9. The method of claim 7, wherein the second software widget compares the associated effective end date of the auto insurance card with the current date at least once per day.

* * * * *